United States Patent Office 3,035,117

Patented May 15, 1962

3,035,117

MEANS FOR DISABLING CHROMINANCE CHANNEL DURING LUMINANCE SIGNAL ADJUSTMENT

Eric Ribchester, Hanworth, England, assignor to Hazeltine Research, Inc., Chicago, Ill., a corporation of Illinois Filed Aug. 31, 1959, Ser. No. 837,098
Claims priority, application Great Britain Sept. 15, 1958
4 Claims. (Cl. 178—5.4)

Figures 1, 2:
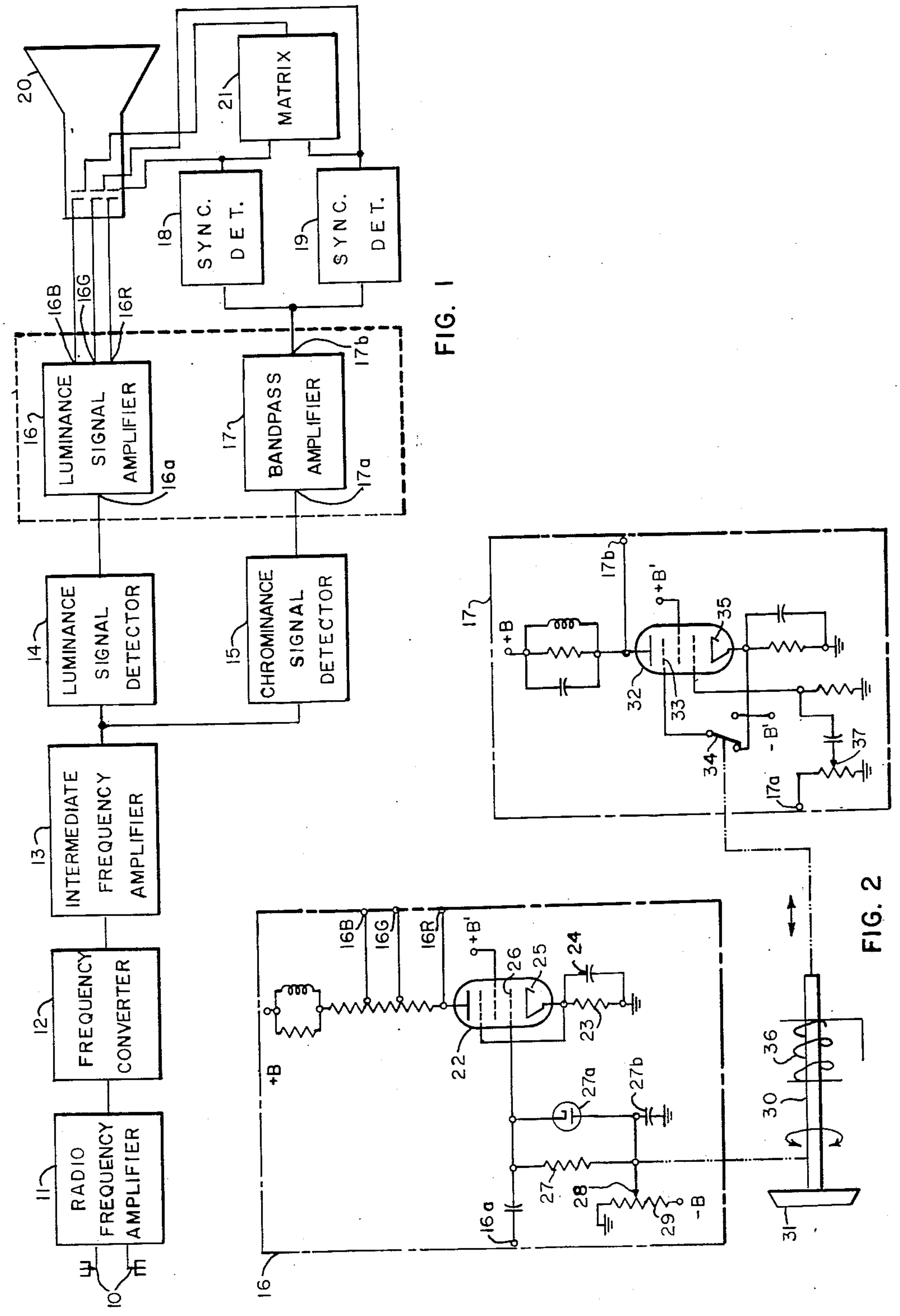

This invention relates to control apparatus for a color-television receiver and, in particular, to apparatus for adjusting the image luminance more easily during color signal reception.

In conventional color-television receivers it is usual to provide a control whereby the brightness of the reproduced picture may be varied. However, where, as is usually the case, this control varies the magnitude of the D.-C. component of the luminance signal applied to the picture reproduction device without appreciably affecting the magnitude of the chrominance signal applied to the device, maniplation of this control varies not only the brightness but also the saturation of the elements of the reproduced picture. Consequently, it is difficult for the viewer to select a desirable setting of the brightness control of the receiver.

Therefore, it is an object of the present invention to provide new and improved control apparatus in a color-television receiver which avoids the aforementioned disadvantage.

It is also an object of the present invention to provide control apparatus for a color-television receiver whereby the viewer may adjust the luminance level with or without the presence of color in the image.

In accordance with the present invention, control apparatus in a color-television receiver comprises first circuit means for translating a luminance signal with a controllable D.-C. component representative of brightness, and second circuit means for translating a chrominance signal. The apparatus also includes unitary control means coupled to both the first and second circuit means for disabling translation of the chrominance signal while maintaining its level and for adjusting the D.-C. component of the luminance signal while the translation of the chrominance signal is disabled.

For a better understanding of the present invention, together with other and further objects thereof, reference is had to the following description, taken in connection with the accompanying drawings, and its scope will be pointed out in the appended claims.

Referring to the drawings:

FIG. 1 is a diagram of a color-television receiver which may be used in connection with the present invention, and FIG. 2 is a circuit schematic of portions of the FIG. 1 receiver which illustrates a preferred embodiment of the present invention.

Referring now more particularly to FIG. 1, the receiver shown is of the superheterodyne type and includes a radio-frequency amplifier 11, for amplifying the received composite television signal fed to it from antenna apparatus 10, and a frequency converter 12 in which the frequency of the main television carrier is converted to an intermediate frequency. The television signal is then fed through an intermediate-frequency amplifier 13 of one or more stages to separate luminance signal and chrominance signal detectors 14 and 15, respectively. The output of the luminance signal detector 14 is coupled to input terminal 16*a* of luminance signal amplifier 16 and the output of the chrominance signal detector 15 is coupled to input terminal 17*a* of band-pass amplifier 17 having a band-pass characteristic of, for example, 3.0 to 4.2 megacycles. Output terminal 17*b* is then coupled to a pair of synchronous detectors 18 and 19 where red and green color-difference signals R—Y and G—Y are respectively detected in known manner by the application, in appropriate phases, of a locally generated reference oscillation from a conventional oscillator circuit (not shown). Output terminals 16R, 16G, 16B of luminance signal amplifier 16 are individually coupled to the cathodes of the three electron guns of color-image-reproducing apparatus 20 so as to produce a monochrome image on the screen thereof. The outputs of synchronous detectors 18 and 19 are coupled to conventional matrixing circuit 21 which produces a blue color-difference signal B—Y, the three color-difference signals being respectively coupled to three control grids of the apparatus 20, thereby adding color information to the monochrome picture. With the exception of the control arrangement used in connection with the circuits within the dotted box in FIG. 1, the various circuits are of conventional construction and operate in a well known manner to produce a color image at the screen of apparatus 20.

Referring to FIG. 2, control apparatus constructed in accordance with the present invention will now be described. Such control apparatus comprises first circuit means for translating a luminance signal with a controllable D.-C. component representative of brightness. This means may be luminance signal amplifier 16 which includes a pentode valve 22, connected in a conventional amplifying circuit, the cathode 25 of the pentode being connected to ground via a resistor 23 and a capacitor 24 connected in parallel so as to provide, in a known manner, a bias voltage for valve 22. The control grid 26 of pentode 22 is connected via a high value grid leak resistor 27 to a variable tapping point 28 on a rotatably controlled variable impedance such as resistive potentiometer 29. A D.-C. restorer comprising diode 27*a* coupled in parallel across grid leak resistor 27 is inserted to provide stabilization of the black level in the video signal. Capacitor 27*b* is coupled from the tapping point of potentiometer 29 to ground to provide a low impedance by-pass at video frequencies across the grid bias impedance. The two ends of the potentiometer 29 are respectively connected to ground and to a point —B having a negative potential with respect to ground. With this arrangement, variation of the position of the tapping point conventionally varies the operating point of the luminance signal amplifier and hence the brightness of the reproduced picture.

Tapping point 28 on potentiometer 29 is arranged to be varied by means of the rotary movement of shaft 30, a knob 31, to which the viewer has access, being fitted to one end thereof.

Second circuit means for translating a chrominance signal includes band-pass amplifier 17 in the chrominance signal channel having a pentode valve 32 connected in a conventional band-pass amplifying circuit, the suppressor grid 33 of this pentode being connectable via a switch 34 to a point having a potential —B′ sufficiently negative with respect to the cathode 35 of pentode 32 to cut the pentode off when switch 34 is closed.

The control apparatus of FIG. 2 also includes control means including shaft 30 coupled to both the luminance and chrominance circuits for disabling the translation of the chrominance signal and for adjusting the D.-C. component of the luminance signal while the translation of the chrominance signal is disabled. Switch 34 is arranged to be operated by means of an axial translation motion of shaft 30, switch 34 being normally open and closed only when the knob is pressed. In its normally open position, switch 34 connects suppressor grid 33 to cathode 35 of pentode 32 in accordance with conventional pentode operation. Shaft 30 is preferably spring-loaded by spring 36 so that switch 34 returns to its normally open position when pressure on knob 31 is relaxed.

In the operation of the control apparatus, when knob 31 is pressed, the application of the chrominance signals to apparatus 20 is prevented so that a monochrome picture is reproduced. In addition, as stated above, rotation of knob 31 varies the brightness of the reproduced picture. Thus, if knob 31 is first pressed and then rotated, adjustment of the brightness of the reproduced picture is facilitated since only the brightness of the picture is varied by rotation of knob 31 and not, as would be the case if knob 31 were not first pressed, the over-all saturation of the picture as well.

The over-all saturation of the reproduced picture may, of course, be adjusted by varying the gain of the chrominance channel of the receiver by means of a suitable potentiometer control 37.

It will be appreciated that, if desired, the brightness of the reproduced picture may be adjusted without removal of the chrominance signals from apparatus 20 by rotating knob 31 without pressing it.

In other arrangements in accordance with the invention, the control, by means of which the chrominance signals may be prevented from being applied to apparatus 20, may be made quite separate from the brightness control of the receiver.

It will be noted that the FIG. 1 receiver utilizes separate luminance and chrominance signal detectors in accordance with conventional color-television receiver practice in England. However, the control apparatus may be used in receivers using a single second detector without any modification in the invention. For example, if a single detector were used in place of detectors 14 and 15 of FIG. 1, its output could be coupled through a band-pass filter with a pass band of 0–3 megacycles to amplifier 16 and also directly to band-pass amplifier 17.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a color-television receiver, control apparatus comprising: first circuit means for translating a luminance signal with a controllable D.-C. component representative of brightness; second circuit means for translating a chrominance signal; and unitary control means coupled to both the first and second circuit means for disabling the translation of the chrominance signal while maintaining its level and for adjusting the D.C. component of the luminance signal while the translation of the chrominance signal is disabled.

2. In a color-television receiver, control apparatus comprising: means for supplying a luminance signal; means for supplying a chrominance signal; color-image-reproducing apparatus for utilizing said signals; first circuit means including a variable impedance circuit for translating said luminance signal to said apparatus with a controllable D.-C. component representative of brightness; second circuit means including a disabling switch for translating said chrominance signal to said apparatus; and unitary control means coupled to said variable impedance circuit and said disabling switch for disabling the translating of the chrominance signal while maintaining its level and controlling the D.-C. component of the luminance signal during said disabled translation.

3. In a color-television receiver, control apparatus comprising: means for supplying a luminance signal; means for supplying a chrominance signal; color-image-reproducing apparatus for utilizing said signals; first circuit means with a rotatably controlled variable impedance circuit for translating said luminance signal to said apparatus with a controllable D.-C. component representative of brightness; second circuit means including a push-pull disabling switch for translating said chrominance signal to said apparatus; and a manually controlled shaft rotatably connected to said variable impedance and connected in an axially translatable manner by means of a spring-loaded mount to said push-pull switch for disabling the translation of the chrominance signal and controlling the D.-C. component of the luminance signal during said disabled translation.

4. In a color-television receiver, control apparatus comprising: means for supplying a luminance signal; means for supplying a chrominance signal; color-image-reproducing apparatus for utilizing said signals; first circuit means including an amplifier circuit with a gain control circuit having a rotatably controlled potentiometer for translating said luminance signal to said apparatus with a controllable D.-C. component representative of brightness; second circuit means including an amplifier circuit with a translatably controlled normally open cutoff switch for translating said chrominance signal to said apparatus; and a manually controlled shaft rotatably connected to said potentiometer and axially translatably connected to said switch for disabling the translation of the chrominance signal and controlling the D.-C. component of the luminance signal during said disabled translation.

References Cited in the file of this patent

Rider Television Manual, volume 19, RCA TV, pp. 19–118 and 19–130, December 4, 1956.